Figure 1:
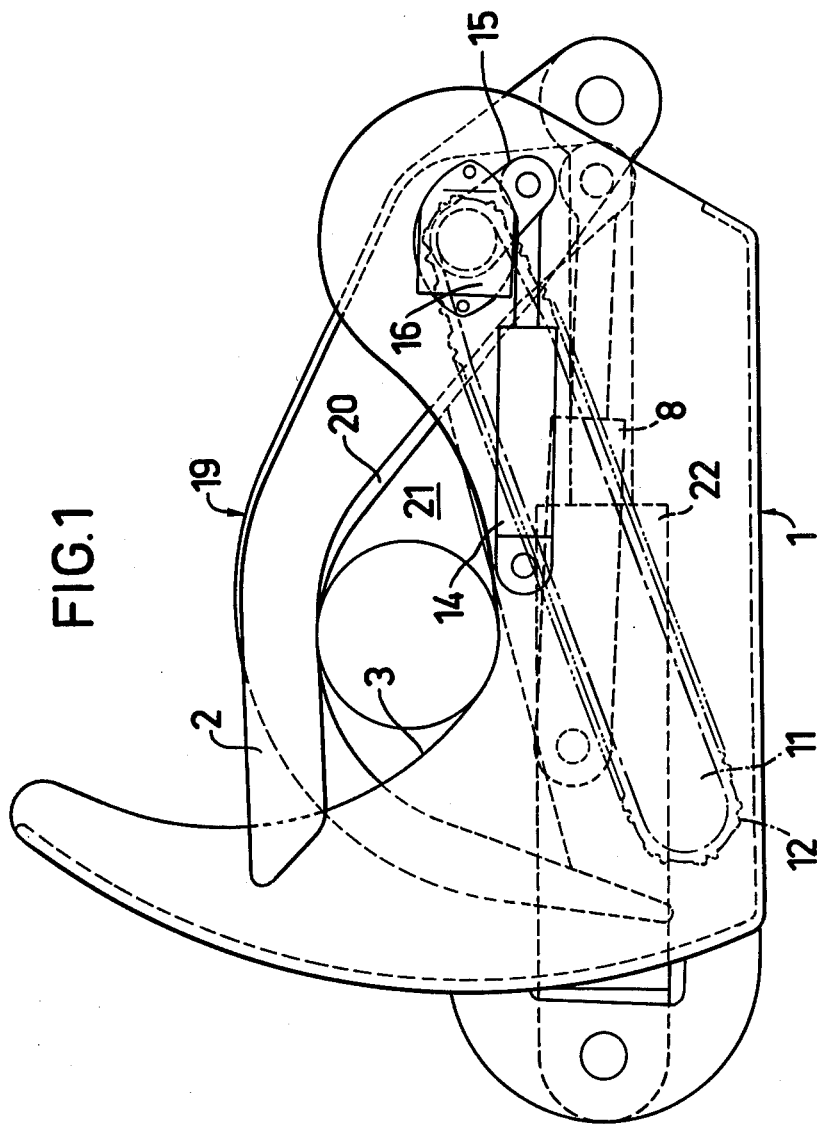

United States Patent [19]

Ericsson

[11] 4,116,250
[45] Sep. 26, 1978

[54] TREE FELLING UNIT

[75] Inventor: Jan-Eje Ericsson, Sundsvall, Sweden

[73] Assignee: Umeå Mekaniska AB, Umea, Sweden

[21] Appl. No.: 728,647

[22] Filed: Oct. 1, 1976

[30] Foreign Application Priority Data

Oct. 7, 1975 [SE] Sweden .................... 7511207

[51] Int. Cl.² ............................ A01G 23/08
[52] U.S. Cl. ..................... 144/34 R; 144/309 AC
[58] Field of Search ............ 144/2 Z, 3 D, 34 R, 144/34 E, 309 AC; 83/928

[56] References Cited

U.S. PATENT DOCUMENTS

| 3,610,301 | 10/1971 | Jordan | 144/34 E |
| 3,885,610 | 5/1975 | Forslund et al. | 144/34 R |
| 3,976,111 | 8/1976 | Jonsson | 144/34 E |

Primary Examiner—Frank T. Yost
Assistant Examiner—W. D. Bray
Attorney, Agent, or Firm—Burns, Doane, Swecker & Mathis

[57] ABSTRACT

A tree felling unit includes a stand on which a clamping device powered by a hydraulic cylinder is pivotally mounted such that the tree to be felled can be clamped against the stand. Also, pivotally mounted on the stand for engaging the tree at about the same level are a chain saw powered by a hydraulic motor and a shearing knife powered by a hydraulic cylinder. The shearing knife performs its shearing movement in the direction against the feed direction of the chain saw.

1 Claim, 4 Drawing Figures

TREE FELLING UNIT

BACKGROUND FOR THE INVENTION

This invention relates to a tree felling unit of the kind, which comprises a stand, a saw chain within the stand, and at least one clamping device for clamping the tree to be felled against the stand.

For machine felling of trees two types of felling units exist, which are different in principle, to wit, units shearing off the trees and units sawing off the trees. The firstmentioned type of felling unit is equipped with hydraulically or pneumatically operated shearing devices provided with knives, by means of which the trees are sheared off. These shearing felling units have the advantage of working relatively rapidly and, therefore, they can advantageously be utilized particularly in the case of a tree of small-dimension. It was, however, found that on trees of greater dimensions these felling units cause considerable wood and splinter damages because of the large pressure forces, which are required for shearing off the tree and applied substantially perpendicularly to the fibre direction in the tree. These wood and splinter damages cause large timber losses particularly on saw timber.

Since recently, therefore, felling units to a certain extent are equipped with a saw chain, which by its cutting mode of operation treats the tree much more gently than do shearing devices and does not give rise to any wood or splinter damages. This type of felling unit, on the other hand, operates much slower than the shearing felling units and, besides, the felling units equipped with a saw chain have the disadvantage, that immediately before and especially at the moment of through-sawing they are not capable of holding the tree so firmly that pinching and clamping of the saw chain is prevented. The trees, by their own weight, and their swinging moment inherent or imparted to them during the sawing operation, usually subject the saw chain to extraordinary stresses with resulting damages of the chain and/or its drive mechanism.

The present invention, therefore, has the object of eliminating to the greatest possible extent the disadvantages of the known felling units with saw chain and, more precisely, of producing a felling unit with saw chain which is much more reliable in operation and works faster than the known units of this kind. This object is achieved thereby that the felling unit according to the present invention shows the characterizing features defined in the claims.

Figure 2:
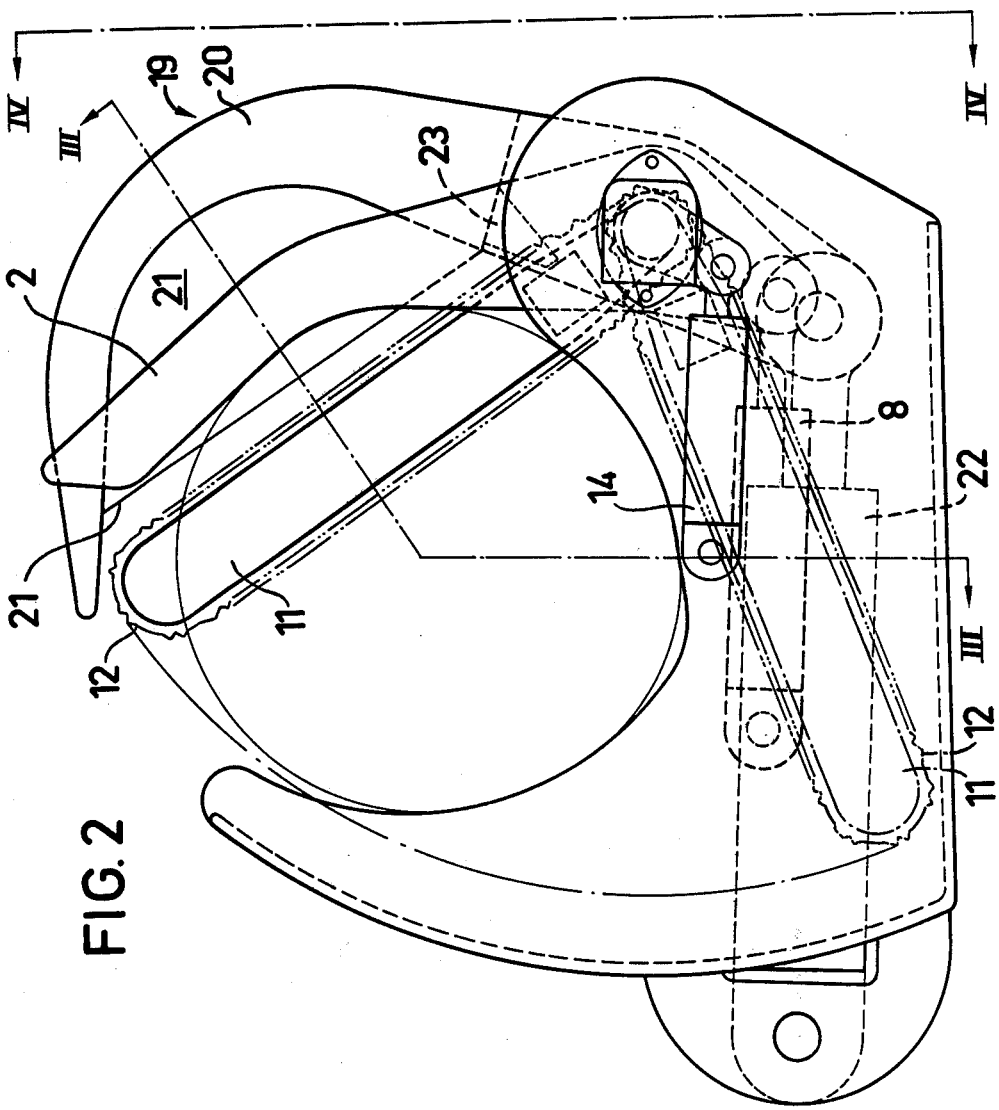
Figure 3:
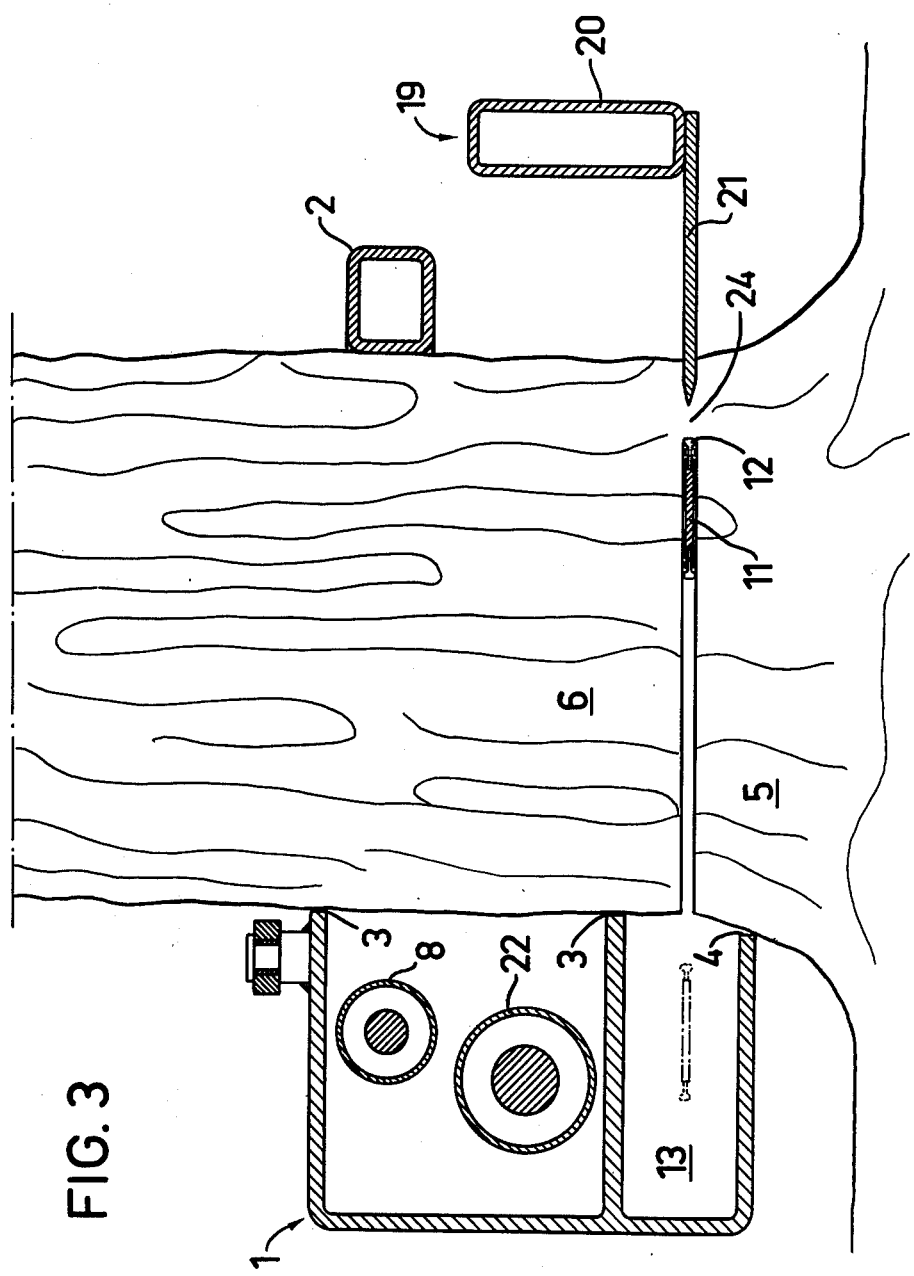
Figure 4:
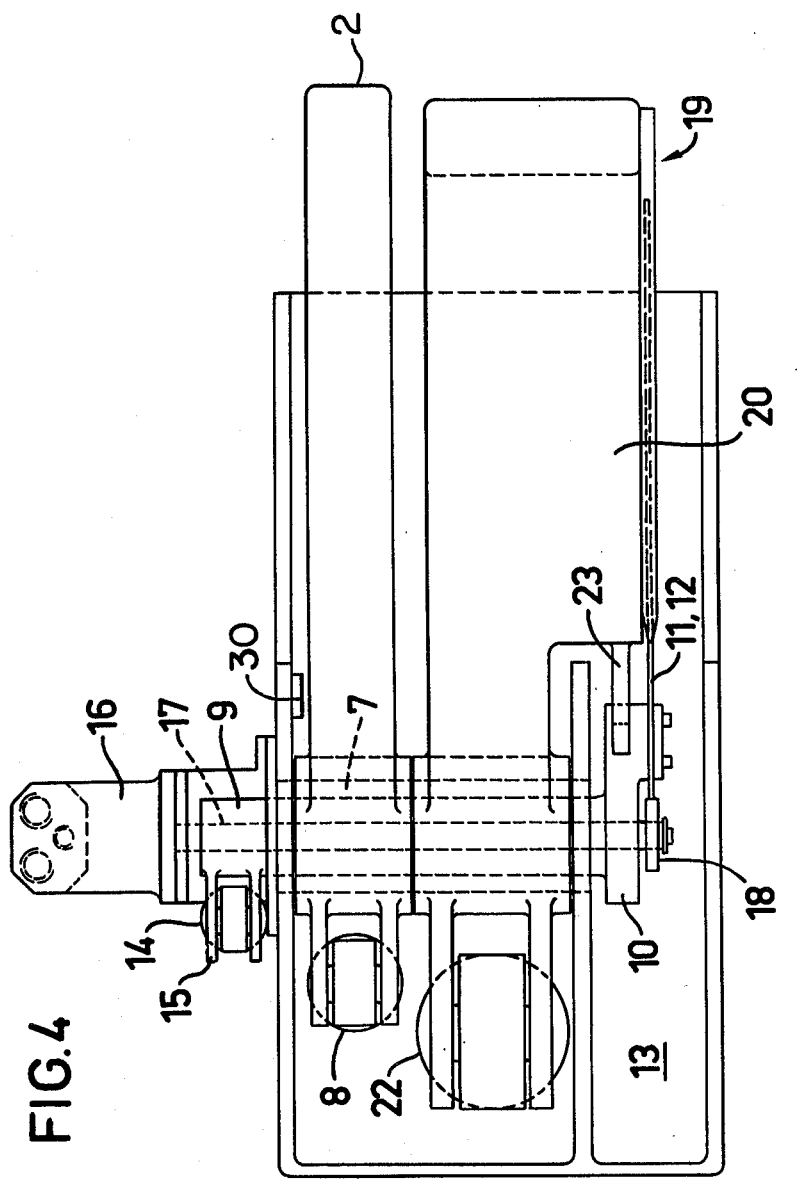

The invention is described in greater detail in the following, with reference to the accompanying drawings, in which FIG. 1 is a view seen from above of a preferred embodiment of the felling unit according to the invention in a position in which a tree of small dimensions just has been separated, FIG. 2 is a view seen from above of the embodiment shown in FIG. 1, but in a position immediately before the separation of a tree of greater dimensions, FIG. 3 is a schematically shown section along the line III—III in FIG. 2, and FIG. 4 is a lateral view of the embodiment of the felling unit according to the invention along the line IV—IV in FIG. 2.

The felling unit according to the invention comprises a stand 1 intended to be supported, in mannerknown, on a forest tractor, forest crane or another expedient machine. The stand 1 has substantially U-shape and carries at least one clamping device 2 for clamping the tree to be separated against support surfaces 3, 4, which are arranged in spaced relationship on the stand 1 and vertically offset to the clamping device 2. Of said support surfaces, the surface designated by 4 is located slightly outside of the two other support surfaces 3, which must not lie in the same plane, in order to compensate for the difference in diameter between the stump 5 and the tree stem 6.

In the embodiment shown, the clamping device 2 is mounted pivotally about a hollow shaft 7 rigidly secured in the stand 1 and can be operated by means of a hydraulic cylinder 8, which renders possible an inward pivotal movement of the clamping device 2 in the stand 1 to such an extent that even trees of very small dimensions can be seized and held firmly against the support surfaces 3, 4. Within the hollow shaft 7 secured in the stand 1 a hollow shaft 9 is rotatably mounted and provided with a holder 10, to which a guide bar 11 with a saw chain 12 is attached. The saw chain 12 is arranged so that in its starting position, which is indicated by dash-dotted lines in FIGS. 1, 2 and 3, it lies protected within a compartment 13 in the stand proper 1, and for separating a tree can be pivoted out from the stand toward and into the tree. This pivotal or feed movement is effected by a hydraulic cylinder 14, which is hingedly connected to the shaft 9 via a pair of projecting lugs 15. The saw chain proper 12 is driven by a hydraulic motor 16, the outgoing axle 17 of which extends through the hollow shaft 9 and by means of a sprocket wheel 18 is connected to the saw chain 12 as shown in greater detail in FIG. 4.

In the illustrated embodiment of the felling unit according to the invention, the saw chain 12 is shown attached to the lower end of the shaft 9, but it may according to another embodiments be located on any height level within the stand proper. However, in order to obtain a stump height as low as possible, the saw chain, of course, should be positioned as close as possible to the bottom of the stand, as shown in the drawing.

The felling unit according to the invention further comprises a shearing device 19, which only by way of example is shown in the form of a curved arm 20 provided with an exchangeable shearing knife 21. This shearing device 19 is mounted pivotally about the same rigid shaft 7 as the clamping device 2 and is operated by means of a hydraulic cylinder 22 of its own. This cylinder is arranged so as first to pivot with a relatively small force the shearing device 19 inward toward and preferably all the way into abutment to the tree to be felled, and thereafter, but only if necessary, to cause this inward pivotal movement, which now acts as a cutting or shearing movement, to continue at maximum force for separating the tree.

The shearing knife 21 in the embodiment shown is located directly in front of the saw chain 12, as shown particularly in FIG. 3, but the shearing knife can also be positioned slightly offset, either upward or downward in relation to the chain 12, without jeopardizing the desired function. The shearing knife 21 being rigidly connected to a carrying arm of the kind shown in the drawings, this arm 20 should be curved to a substantially greater degree than the clamping device 2, and the curvature preferably should be such that the shearing knife 21 is given a depth and a width corresponding to a tree diameter of up to at maximum 3–4 dm, and preferably about 2 dm, or what is the usual minimum diameter for saw timber, so that the shearing knife can be used for shearing off trees of relatively small dimensions and, thus, of such trees which deliver only pulp wood or the like, at which possible timber damages are not of importance, without having to make use of the saw chain. The shearing device, however, by its configuration prevents the direct shearing off of trees having a diameter exceeding the maximum depth and/or width of the shearing knife and being suitable for use as saw timber where it is desired to avoid timber damages to the greatest possible extent.

According to other embodiments, not shown, the shearing knife may be attached to or designed integral with an arm, which is as slender as the shearing knife and entirely lies in the same plane therewith, and which, thus, does not obstruct the shearing off of trees of greater dimensions, when desired. The clamping device 2, further, may have fork-shape, with the shearing device pivotally mounted between the two clamping arms or legs of the clamping device.

In the following, the mode of operation of the felling unit is explained in greater detail. After the felling unit by its operator has been applied about a tree to be felled, the hydraulic cylinders 8 and 22 are actuated for pivoting the clamping device 2 inward in order to clamp the tree against the support surfaces 3 and 4 of the stand and, respectively, to abut the shearing device 19 to the tree. In the embodiment shown, the inward pivotal movement of the clamping and shearing devices 2 and 19 takes place individually and in such a manner, that the shearing device 19 continues its inward pivotal movement even after a predetermined counterpressure has been achieved, if the tree to be separated is found to have a diameter equal to or smaller than the maximum tree diameter, for which the shearing knife or the shearing device is calculated. This determination of dimension can take place manually by the operator or automatically by the help of means such as a limit switch or photoelectric cell or some other conventional means, generally indicated at 30, which triggers when the clamp 2 moves within a pre-determined distance from the stand 1, thus indicating whether the diameter of the tree being clamped is bigger or smaller than the maximum tree diameter for which the shearing knife can be used. Through such means or other means well known to those skilled in the art, the diameter of a tree can be determined whereby, for example, the angle is registered which the clamping device 2 covers in relation to the stand when the tree is clamped, or the angular distance through which the clamping device 2 must be pivoted for clamping the tree. When the tree thus clamped is deemed to have a diameter smaller than said maximum tree diameter, the hydraulic cylinder 22 of the shearing device 19 receives a high or maximum pressure and continues to pivot the shearing device 19 inward to one end position thereof, as shown in FIG. 1, and thus to effect separation of the tree without having to use the saw chain. When, however, the tree to be felled is deemed to have a diameter exceeding said maximum tree diameter, the inward pivotal movement of the shearing device 19 is interrupted as soon as the predetermined counterpressure has been achieved. At the same time the hydraulic cylinder 14 is switched in and feeds the saw chain driven by the motor 16 into the tree in the direction to the shearing device 19. This feed movement goes on automatically all the way to an end position, which is determined by a preferably adjustable stop member 23 for the holder 10 provided with the shearing device 19, and in which position the feed of the saw chain 12 is stopped immediately before the tree has been sawn through. As the tree in this position is not sawn through completely, it is supported by the unsawn portion 24, and the saw chain 12 can be returned to its protected starting position within the stand 1 without having to be subjected to any greater stresses, because it is possible with the felling unit to hold the tree in such a manner, that the saw cut 24 remains intact, which has proved difficult to achieve with such felling units where the tree is sawn through entirely by means of a saw chain. After the saw chain has been returned to its starting position, the pressure of the hydraulic cylinder 22 is increased in order to cause the shearing device 19 to shear off the remaining part 24 of the tree.

The invention is not restricted to the embodiments described above and shown in the drawings, but can be modified and varied in many ways within the scope of the idea of the invention as it is apparent from the claims.

What I claim is:

1. A tree-felling unit comprising
    a substantially U-shaped stand with a tree-receiving space;
    at least one clamping means mounted in said stand for clamping the stand against a tree received in said space and to be felled;
    a saw chain means supported by said stand for operative movement into said space to perform an incomplete saw-through of such tree;
    a shearing means supported by the stand at substantially the same level as the saw chain means for a shearing movement substantially in an opposed direction to that of the operative movement of the saw chain means,
    said saw chain means being mounted for operative movement from a protective position within said stand into the tree-receiving space in a direction away from said stand;
    said shearing means, the shearing movement of which is substantially opposed to the operative movement of said saw chain means, being movable, at least with its cutting edge, all the way into the bottom plane of the tree-receiving space of the stand thereby making it possible for said shearing means also to effect a direct cutting of a tree having a diameter smaller than a predetermined diameter;
    independent power means to effect the different movements of said clamping means, said saw chain means and said shearing means, respectively; and
    means sensing the diameter dimension of a tree to be felled, to start the operative movement of the saw chain means when sensing a tree having a diameter greater than said predetermined diameter and to start the cutting movement of the shearing device when sensing a tree having a diameter smaller than said predetermined diameter.

* * * * *